UNITED STATES PATENT OFFICE.

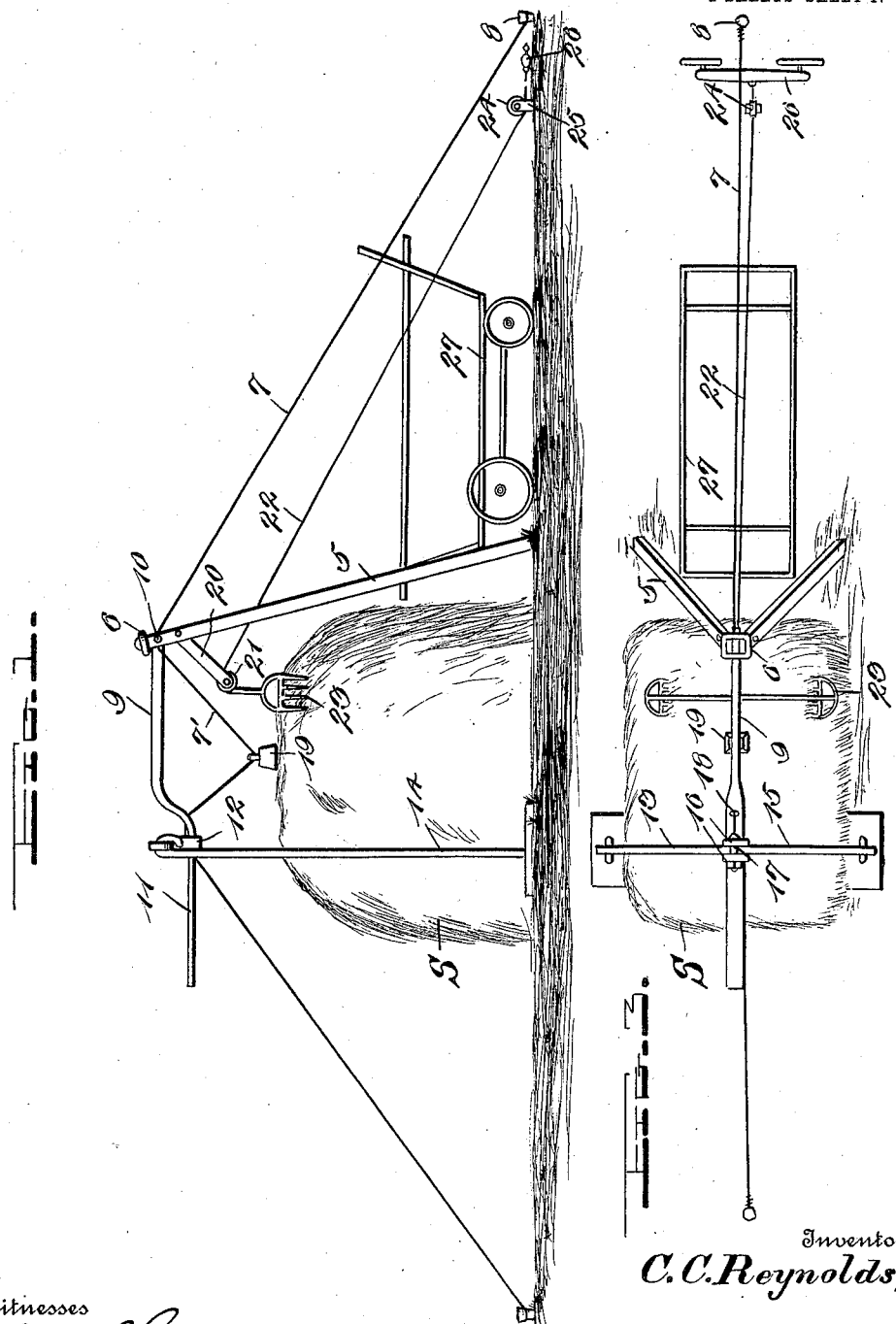

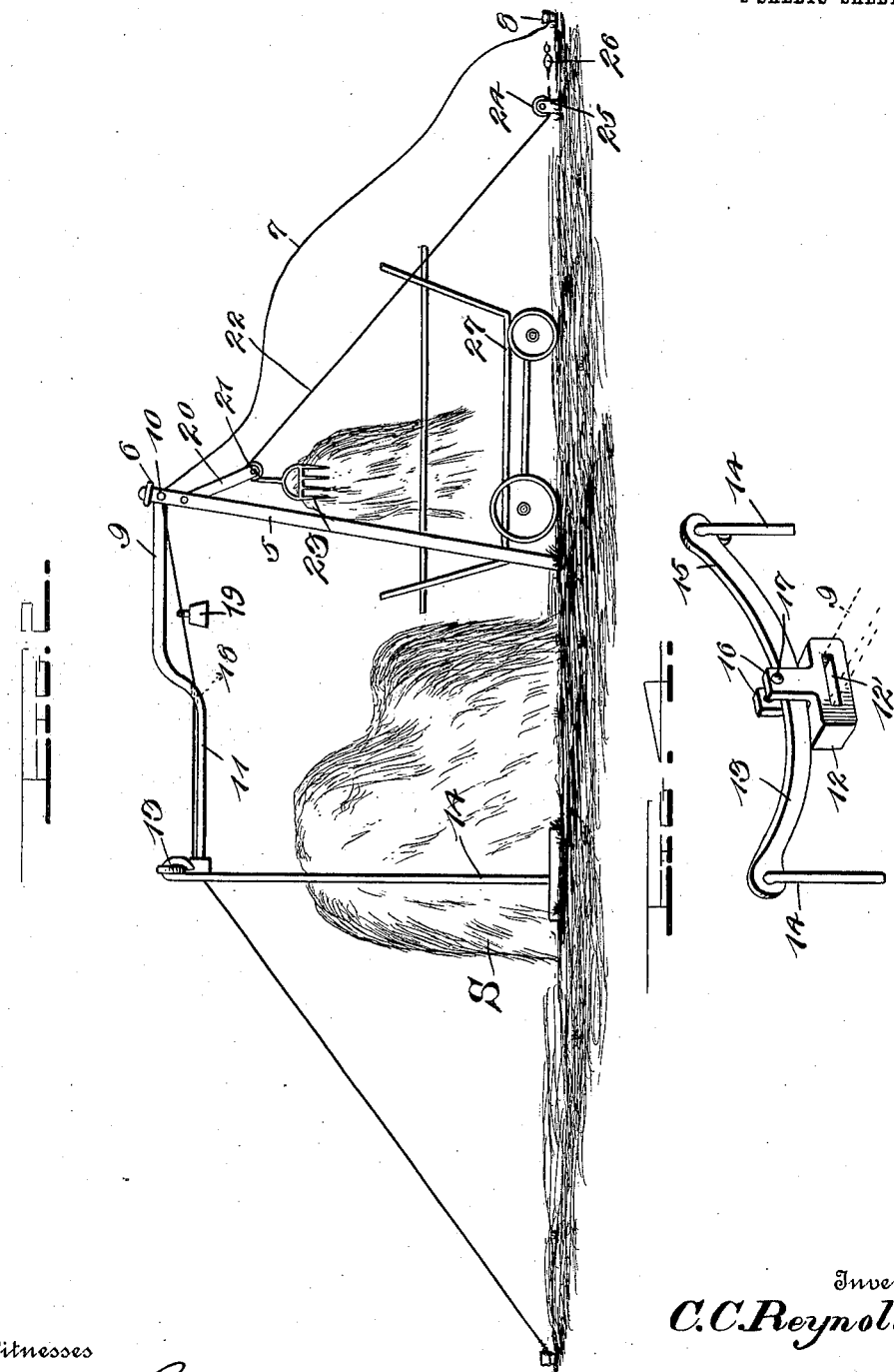

CHARLES C. REYNOLDS, OF MILLS, NEBRASKA.

HAY-LOADER.

1,031,027.  Specification of Letters Patent.  Patented July 2, 1912.

Application filed February 19, 1912. Serial No. 678,446.

*To all whom it may concern:*

Be it known that I, CHARLES C. REYNOLDS, a citizen of the United States, residing at Mills, in the county of Keyapaha and State of Nebraska, have invented certain new and useful Improvements in Hay-Loaders, of which the following is a specification, reference being had to the accompanying drawings.

This invention relates to improvements in hay loaders and has for its object to provide a very simple, extremely efficient and easily operated device of this character whereby the hay may be quickly loaded upon a suitable transporting vehicle.

Another object of the invention resides in the provision of a loader of that character embodying a pair of swinging poles or supports, a grapple carried thereby, a brace wire connected to the upper ends of said supports extending upon opposite sides of the hay stack, the ends of the wire being secured to stakes, means connected to the supports and engaging the hay stack to prevent lateral movement of the supports, and means for maintaining the slack in the wire to permit of the swinging movement of the poles whereby the grapple is disposed above the wagon to be loaded.

With the above and other objects in view, the invention consists of the novel features of construction, combination and arrangement of parts hereinafter fully described and claimed, and illustrated in the accompanying drawings, in which—

Figure 1 is a side elevation illustrating a hay loader embodying my improvements; Fig. 2 is a similar view showing the poles swung away from the hay stack to dispose the grapple over the wagon; Fig. 3 is a top plan view; and Fig. 4 is a detail perspective view of the brace member for the poles and the pivoted arm which is associated therewith.

Referring in detail to the drawing 5 designates a pair of poles which extend convergently at their upper ends and are rigidly secured together by means of a metallic band 6. These poles are adapted to be arranged at one end of the hay stack indicated at 8, with their lower ends bearing upon the ground. A wire 7 extends over the hay stack and is rigidly secured between the connected upper ends of the poles 5. The opposite ends of this wire extend to points some distance from the stack and are securely fastened to the stakes 8 which are driven into the ground.

One end of an arm 9 is pivoted as indicated at 10 between the upper ends of the poles 5 and extends over the hay stack in spaced relation thereto. The other end of this arm is offset as indicated at 11, and such offset end of the arm is loosely disposed for movement in a guide member 12 which is arranged upon a brace 13. This brace consists of two vertical rods 14 which extend in divergent relations from a curved connecting portion 15 and are fixed to a suitable base or object at their lower ends. The guide member 12 is provided with spaced ears 16 which are disposed upon opposite sides of the connection portion 15 of the brace member. A clamping bolt 17 connects said arms and serves to rigidly hold the guard member in position upon said brace. The opening 12' of the guide member through which the end 11 of the arm 9 extends is sufficiently large to also receive the wire 7 which is disposed through an opening 18 in the offset end of the arm. When the poles 5 are in their normal positions and inclined toward the stack as clearly shown in Fig. 1, the wire 7 has a slack portion indicated at 7' which extends between the upper ends of said poles and the brace member 15. Upon this slack portion of the wire a weight 19 is arranged whereby the portions of the wire extending from opposite ends of the stack to the stakes 8 are held taut. A second arm 20 is also pivotally mounted at one end between the poles 5 and upon the free end of this arm a guide pulley or sheave 21 is mounted. A cable 22 extends around this sheave and is connected to a grapple 23 which may be of any ordinary or approved form. The cable 22 also passes around a second sheave 24 which is secured to a stake 25 in the ground, and to the end of the cable the draft attachments 26 are connected to which horses or other animals may be attached to provide the operating power.

From the foregoing the operation of the device will be understood as follows. After the wagon or other vehicle indicated at 27 has been arranged at one end of the stack between the poles 5, the operator draws the grapple downwardly into the hay by means of a wire or cord attached thereto and the horses are then driven to pull upon the cable 22 and draw the grapple upwardly. After the grapple reaches the limit of its upward movement, continued pull upon the cable will swing the poles 5 to the right to dispose the grapple above the body of the vehicle 27. In this swinging movement of the poles, the offset end 11 of the arm 9 moves through the opening 12' of the guide member 12 and the slack 7' in the wire is taken up. After the grapple has released its load, and pull upon the cable 22 by the animals is discontinued, the weight 19 on the wire 7 acts to return the poles 5 to their normal positions as shown in Fig. 1. Of course it is understood that the amount of slack in the wire 7 is commensurate with the extent of swinging movement of the poles 5.

A hay loader constructed in the manner above described provides means for very quickly loading the transporting vehicle with the expenditure of a minimum amount of labor.

Owing to the few parts employed and the simplicity of their construction, it will be obvious that the entire apparatus can be produced at very small cost. At the same time the device is extremely durable, positive in its action and will efficiently perform the functions for which the same is devised.

While I have shown and described the preferred construction and arrangement of the various elements, it will be understood that the invention is susceptible of considerable modification without departing from the essential feature or sacrificing any of the advantages thereof.

Having thus described the invention what is claimed is:—

1. In a hay loader, the combination of poles rigidly secured together at their upper ends and free to swing about their lower ends as pivots, an arm pivotally mounted at one of its ends between the upper ends of said poles and adapted to extend over a hay stack, a wire fixed at its ends and having its central portion secured to the upper ends of said poles, means to movably support the free end of said arm and brace the poles, a grapple carried by said poles in their swinging movement to deliver the hay to a vehicle, and means arranged on said wire to return the poles to their normal positions with relation to the stack.

2. In a hay loader, the combination of diverging poles fixed together at their upper ends and fulcrumed at their lower ends for swinging movement, a brace member to be arranged over a hay stack, an arm pivoted to the upper ends of said poles and movably engaging said brace member, a wire fixed at its ends and having its central portions secured to the upper ends of said poles, a grapple carried by the poles in their swinging movement to deliver the hay to a transporting vehicle, and a weight arranged upon said wire between the poles and said brace member to maintain the wire in a slackened condition therebetween and to return the poles to their normal positions with relation to the stack.

3. In a hay loader, the combination of diverging poles fixed together at their upper ends, the lower ends of said poles bearing upon the ground, said poles being adapted to be arranged adjacent to a hay stack for swinging movement with relation thereto, a brace member for the poles to be arranged by the stack, an arm pivotally connected to the upper ends of the poles, a guide member secured to said brace member, the free end of said arm being movable in said guide member, a wire fixed at its ends and extending over the stack through said guide member, said wire being also secured to the upper ends of said poles, a grapple carried by said poles in their swinging movement to deliver the hay to a transporting vehicle, and a weight arranged upon said wire between the poles and the brace member to maintain the same in a slackened condition and return the poles to their normal positions with relation to the stack.

In testimony whereof I hereunto affix my signature in the presence of two witnesses.

CHARLES C. REYNOLDS.

Witnesses:
JOHN WRIGHT,
GEORGE G. BOTHWELL.